(12) United States Patent
Kawamoto

(10) Patent No.: US 11,169,396 B2
(45) Date of Patent: Nov. 9, 2021

(54) EYEGLASSES FRAME

(71) Applicant: Kawamoto Optical Industrial Co., Ltd., Osaka (JP)

(72) Inventor: Shuichi Kawamoto, Osaka (JP)

(73) Assignee: KAWAMOTO OPTICAL INDUSTRIAL CO. LTD., Osaka (JP)

( * ) Notice: Subject to any disclaimer, the term of this patent is extended or adjusted under 35 U.S.C. 154(b) by 263 days.

(21) Appl. No.: 16/449,641

(22) Filed: Jun. 24, 2019

(65) Prior Publication Data

US 2020/0400972 A1    Dec. 24, 2020

(51) Int. Cl.
*G02C 5/22* (2006.01)
(52) U.S. Cl.
CPC ...................................... *G02C 5/22* (2013.01)
(58) Field of Classification Search
CPC ... G02C 5/22; G02C 5/14; G02C 5/16; G02C 5/00
USPC ........ 351/153, 140, 111, 119, 121, 113, 114; 16/228
See application file for complete search history.

(56) References Cited

U.S. PATENT DOCUMENTS

| 3,837,735 | A | * | 9/1974 | Guillet | G02C 5/2227 |
| | | | | | 351/113 |
| 4,605,293 | A | | 8/1986 | Blumenthal | |
| 5,815,899 | A | * | 10/1998 | Chao | G02C 5/2254 |
| | | | | | 29/20 |
| 2018/0039095 | A1 | | 2/2018 | Kawamoto | |

FOREIGN PATENT DOCUMENTS

| JP | 59-188619 A | 10/1984 |
| JP | 2018-21988 A | 2/2018 |

* cited by examiner

*Primary Examiner* — Hung X Dang
(74) *Attorney, Agent, or Firm* — Bacon & Thomas, PLLC

(57) ABSTRACT

Provided is an eyeglass frame that includes a hinge with which a reduction in size and a reduction in weight can be achieved, and stable open/close operations can be performed over a prolonged period of time. The eyeglass frame includes a lens holding portion 2, a temple 3, and a hinge 5 that enables pivoting of the lens holding portion 2 and the temple a The hinge 5 includes a terminal portion 21 of the lens holding portion 2, a terminal portion 31 of the temple 3, and a coupling portion 4 that couples the two terminal portions. The terminal portion 31 of the temple 3 is selectively positioned with respect to the coupling portion 4 at a position when the temple 3 is completely open and at a position when the temple 3 is folded.

8 Claims, 11 Drawing Sheets

FIG 4(a)   FIG. 4(b)   FIG. 4(c)
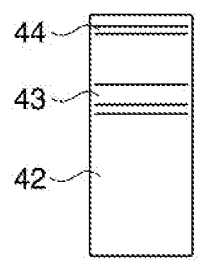
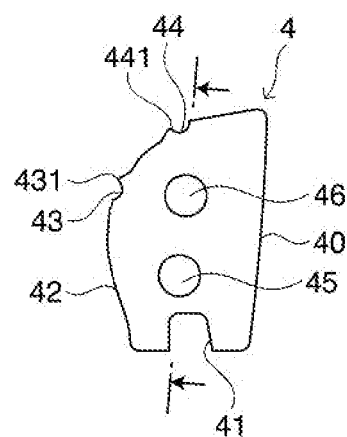
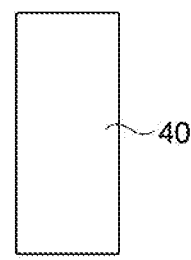
FIG. 4(d)   FIG. 4(e)   FIG. 4(f)
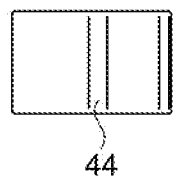
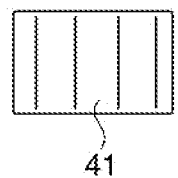
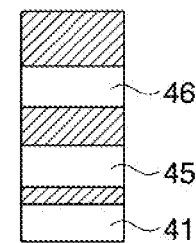

42C 4C
44C
43C
46C
40C
42C
45C
41C

40C

41C 44C
46C
45C
41C

EYEGLASSES FRAME

BACKGROUND OF THE INVENTION

1. Field of the Invention

The present invention relates to an eyeglass frame, and particularly to an eyeglass frame that is provided with a hinge with which a stable open/close operation can be performed and a reduction in size and a reduction in weight can be achieved.

2. Description of Related Art

The hinge of an eyeglass frame allows opening and closing of the temple by a screw, which acts as a pivot axis, coupling hinge barrels respectively provided on a lens holding portion and the temple. In the hinge, the pivot operation of the temple can be adjusted through the tightness of the screw, and when the screw is tightened firmly, friction between the hinge barrels increases and pivoting of the temple becomes stiff, and when the screw is loosened, the temple pivots more freely.

However, the hinge barrels move in a state of being in press-contact with each other when the temple is opened and closed, and therefore, if the temple pivots stiffly, it is difficult to realize a smooth open/close operation, and conversely, if the temple pivots freely, the temple is likely to move in an undesired manner. As a result, it is difficult to set the temple in a stable state at times such as when the glasses are worn with the temple open, and when the glasses are stored with the temple closed. Also, when the open/close operation that causes the temple to pivot is repeated, the frictional resistance against the pivoting of the temple will gradually decrease, and the tightness of the screw will need to be readjusted.

In light of the issues involved with such a hinge, for example, JP S59-188619A discloses an eyeglass frame as described below. That is to say, the eyeglass frame has a configuration in which a spring is provided on one of two frame portions and a cam member is provided on the other frame portion, and a rotation member is set so as to be pressed against the cam member by the elastic biasing means. Accordingly, the one frame portion can be stably set at a predetermined open/close position when an open/close operation is performed.

In the foregoing JPS59-188619A, a spring is incorporated in the hinge, and therefore the size of the hinge increases, and it is difficult to realize a reduction in weight and a reduction in size of the eyeglass frame. Also, in examining the design of the eyeglass frame, the size of the hinge needs to be taken into consideration, therefore limiting freedom of design.

In order to solve the above-described problems, the applicant of the present application has proposed, in JP 2018-21988A, an eyeglass frame as described below. That is to say, the eyeglass frame is provided with a first hinge barrel provided on a lens holding portion, a second hinge barrel provided on a temple, a first screw that pivotably couples the first hinge barrel and the second hinge barrel, and a second screw that is provided in the second hinge barrel, and can come into contact with the first hinge barrel. The tip portion of the first hinge barrel is a cam, and the cam has a first depression where the second screw comes to rest when the eyeglass frame is completely open, a second depression where the second screw comes to rest when the eyeglass frame is completely closed, a substantially straight portion that joins the first and second depressions, and a corner portion where the substantially straight portion changes direction at an intermediate point.

JP S59-188619A and JP 2018-21988A are examples of related art.

SUMMARY OF THE INVENTION

The product according to JP 2018-21988A was well received, but there is the problem that, due to the second screw made of metal frequently coming into contact with and pressing against the first hinge barrel made of resin, wear occurs as a result of long term use, and the open/close operation gradually deteriorates.

Thus, it is an object of the present invention to provide an eyeglass frame that includes a hinge with which a reduction in size and a reduction in weight can be achieved, and stable open/close operations can be performed over a prolonged period of time.

In order to achieve the aforementioned object, an eyeglass frame according to the present invention relates to an eyeglass frame 1 that includes: a lens holding portion 2, a temple 3, and a hinge 5 that enables pivoting of the lens holding portion 2 and the temple 3, wherein the hinge 5 includes a terminal portion 21 of the lens holding portion 2, a terminal portion 31 of the temple 3, and a coupling portion 4 that couples the terminal portion 21 of the lens holding portion 2 with the terminal portion 31 of the temple 3, and a means is provided for selectively positioning the terminal portion 31 of the temple 3 with respect to the coupling portion 4 at a position when the temple 3 is completely open and at a position when the temple 3 is folded.

Preferably, the temple 3 and the coupling portion 4 are made of resin that is viscoelastic, mechanically strong, and highly abrasion resistant such as a urethane resin, a polyamide resin, a fluorine resin, a polyacetal resin, or a polytetrafluoroethylene (PTFE) resin. Particularly preferably, the terminal portion 31 of the temple is made of a polyamide (nylon) resin, and the coupling portion 4 is made of a urethane resin.

Examples of the means for selectively positioning the terminal portion 31 of the temple 3 with respect to the coupling portion 4 at a position when the temple 3 is completely open and at a position when the temple 3 is folded encompass the following combinations:

(a) A combination of small hemispherical protrusions 35 and 36 respectively provided at leading ends of upper-side and lower-side members 32 and 33 of the terminal portion 31 of the temple, and two depressions 43 and 44 of the coupling portion 4;

(b) A combination of depressions 35A and 36A respectively provided at leading ends of upper-side and lower-side members 32A and 33A of the terminal portion 31A of the temple, and two small hemispherical protrusions 43A and 44A of the coupling portion 4A;

(c) A combination of small hemispherical protrusions 35B and 36B respectively provided at leading ends of upper-side and lower-side members 32B and 33B of the terminal portion 31 of the temple, and two grooves 43B and 44B of the coupling portion 4B; and (d) A combination of small hemispherical protrusions 35C and 36C provided, facing each other, between upper-side and lower-side members 32C and 33C of the terminal portion 31 of the temple, and two through holes 43C and 44C of the coupling portion 4C.

According to the present invention, a means is provided for selectively positioning the terminal portion 31 of the temple 3 with respect to the coupling portion 4 at a position when the temple 3 is completely open and at a position when the temple 3 is folded. Both the terminal portion 31 of the temple 3 and the coupling portion 4 are made of resin that is soft and viscous, and thus are less likely to wear even when used over a prolonged period of time, compared to a case where metal and resin come into contact with each other. Accordingly, stable open/close operations can be performed over a prolonged period of time.

BRIEF DESCRIPTION OF THE DRAWINGS

FIG. 3 are transverse cross-sectional views of the hinge portion in FIG. 1; where

FIG. 4 illustrate a coupling portion according to Embodiment 1; where FIG. 4(a) is a left side view, FIG. 4(b) is a front view, FIG. 4(c) is a right side view, FIG. 4(d) is a plan view, FIG. 4(e) is a bottom view, and FIG. 4(f) is a cross-sectional view taken along a line indicated by arrows in FIG. 4(b).

FIG. 5 illustrate a terminal portion of a lens holding portion according to Embodiment 1; where

FIG. 6 illustrate a terminal portion of the temple according to Embodiment 1; where

FIG. 7 illustrate a coupling portion according to Embodiment 2; where

FIG. 8 illustrate a terminal portion of a temple according to Embodiment 2; where

FIG. 9 illustrate a coupling portion according to Embodiment 3; where

FIG. 10 illustrate a terminal portion of a temple according to Embodiment 3; where

FIG. 11 illustrate a coupling portion according to Embodiment 4; where

FIG. 12 illustrate a terminal portion of a temple according to Embodiment 4; where

DETAILED DESCRIPTION OF THE INVENTION

Hereinafter, embodiments of the present invention will be described with reference to the accompanying drawings.

Embodiment 1

FIGS. 1 to 6 show Embodiment 1 of the present invention.

Figure 1:
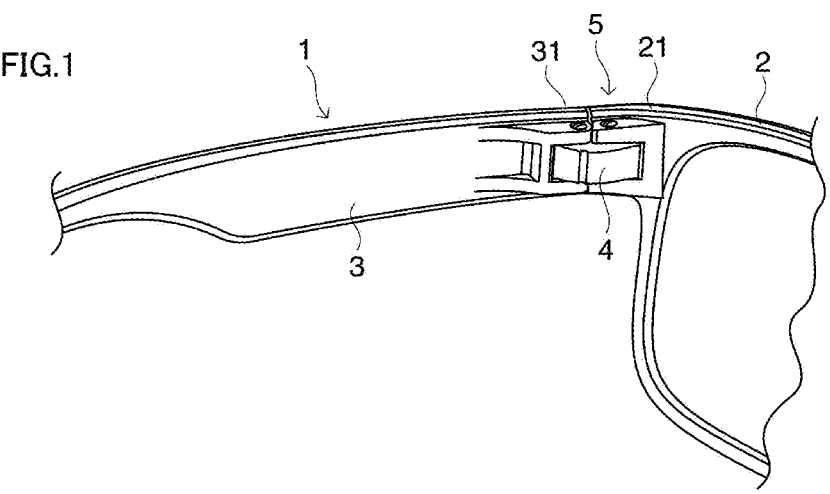
FIG. 1 is an enlarged perspective view illustrating a hinge portion of an eyeglass frame according to Embodiment 1 of the present invention when viewed from the inner side.
Figure 2:
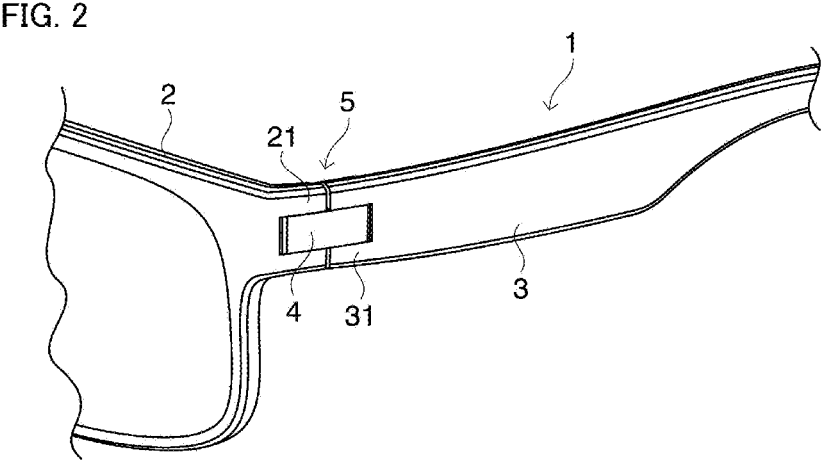
FIG. 2 is an enlarged perspective view illustrating the hinge portion in FIG. 1 when viewed from the outer side.
Figure 3A:
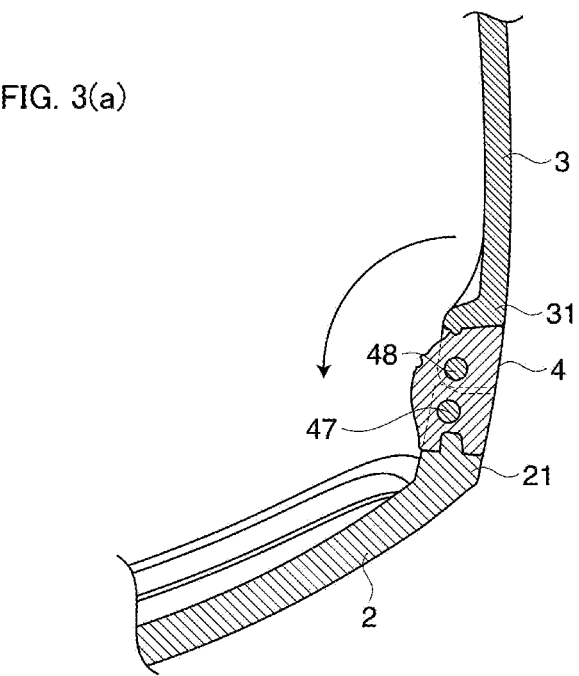
FIG. 3(a) illustrates a state in which a temple is open.
Figure 3B:
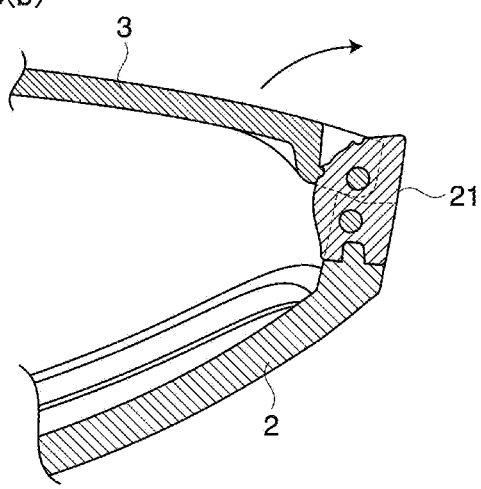
FIG. 3(b) illustrates a state in which the temple is folded.

As shown in FIGS. 1 to 3, an eyeglass frame 1 according to the embodiments of the present invention includes a hinge 5 that enables pivoting of a temple 3. The hinge 5 is constituted mainly by a terminal portion 21 of a lens holding portion 2, a terminal portion 31 of the temple 3, and a coupling portion 4 that couples the two terminal portions.

The coupling portion 4 that couples the terminal portion 21 of the lens holding portion 2 with the terminal portion 31 of the temple is a synthetic resin block as shown in FIG. 4. The coupling portion 4 includes, as contour forming portions, a straight portion 40 that appears on the outer side of the eyeglasses, a recessed portion 41 that engages with the terminal portion 21 of the lens holding portion, and a curved portion 42 on which the terminal portion 31 of the temple slides, as most clearly shown in FIG. 4(b). The curved portion 42 has two depressions (namely, a first depression 43 and a second depression 44). Ends of these depressions are slightly raised outward forming raised portions 431 and 441. The coupling portion 4 has a first screw hole 45 for coupling to the terminal portion 21 of the lens holding portion, and a second screw hole 46 for coupling to the terminal portion 31 of the temple.

Figure 5A:
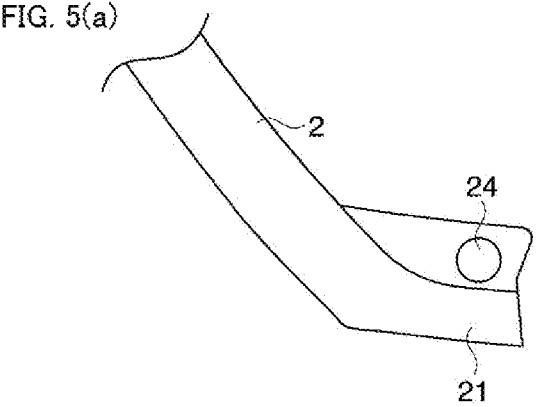
FIG. 5(a) is a plan view.
Figure 5B:
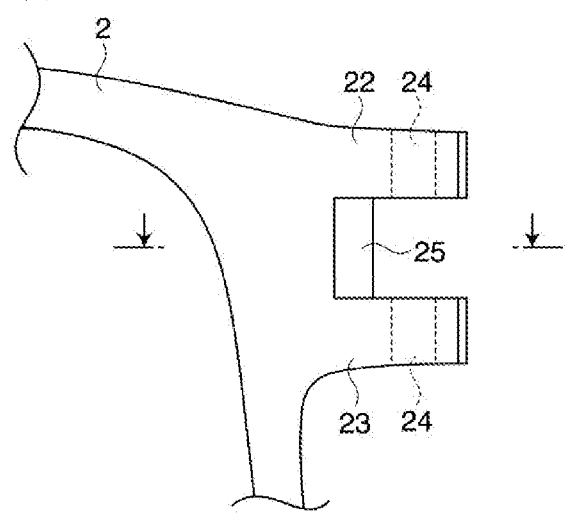
FIG. 5(b) is a side view.
Figure 5C:
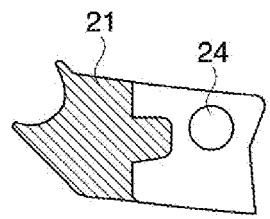
FIG. 5(c) is a cross-sectional view taken along a line indicated by arrows in FIG. 5(b).

As shown in FIG. 5(b), the terminal portion 21 of the lens holding portion has an upper-side member 22 and a lower-side member 23, when viewed from the side. As shown in FIG. 3, the coupling portion 4 is fitted between these upper-side and lower-side members 22 and 23. The terminal portion 21 of the lens holding portion has a third screw hole 24 formed extending through the upper-side and lower-side members 22 and 23. The third screw hole 24 is formed at the same position as the first screw hole 45 of the coupling portion 4, and a screw 47 is inserted into these screw holes 24 and 45 to couple the terminal portion 21 of the lens holding portion with the coupling portion 4 (see FIG. 3).

In a space in which the coupling portion 4 is to be located, a protruding portion 25 is provided between the upper-side and lower-side members 22 and 23 of the terminal portion 21 on the lens-holding side, the protruding portion 25 being fitted to the recessed portion 41 of the coupling portion. Also with this configuration, the terminal portion 21 on the lens-holding side and the coupling portion 4 are reliably coupled to each other.

Figure 6A:
FIG. 6(a) is a plan view.
Figure 6B:
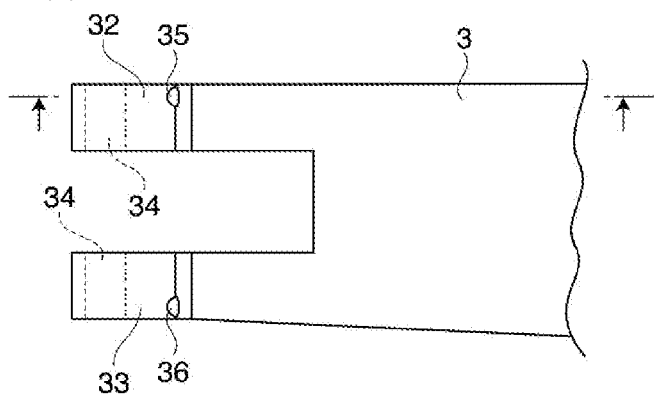
FIG. 6(b) is a side view.
Figure 6C:
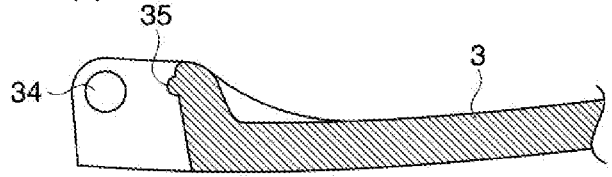
FIG. 6(c) is a cross-sectional view taken along a line indicated by arrows in FIG. 6(b).
Figure 7A:
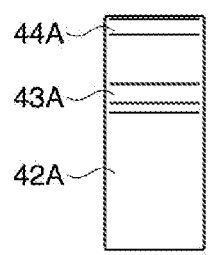
FIG. 7(a) is a left side view.
Figure 7B:
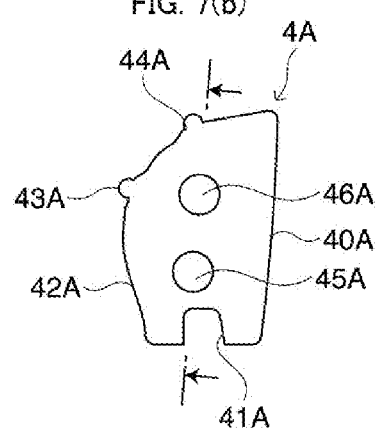
FIG. 7(b) is a front view.
Figure 7C:
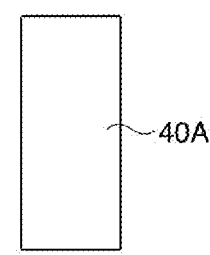
FIG. 7(c) is a right side view.
Figure 7D:
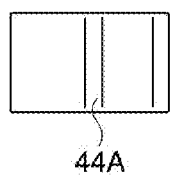
FIG. 7(d) is a plan view.
Figure 7E:
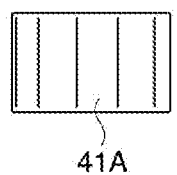
FIG. 7(e) is a bottom view.
Figure 7F:
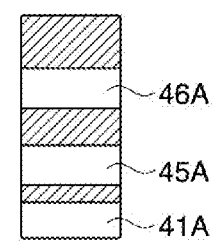
FIG. 7(f) is a cross-sectional view taken along a line indicated by arrows in FIG. 7(b).

As shown in FIG. 6(b), the terminal portion 31 of the temple has an upper-side member 32 and a lower-side member 33, when viewed from the side. As shown in FIG. 3, the coupling portion 4 is fitted between these upper-side and lower-side members 32 and 33. The terminal portion 31 of the temple has a fourth screw hole 34 formed extending through the upper-side and lower-side members 32 and 33. The fourth screw hole 34 is formed at the same position as the second screw hole 46 of the coupling portion 4, and a screw 48 is inserted into these screw holes 34 and 46 to couple the terminal portion 31 of the temple with the coupling portion 4 (see FIG. 3).

In a space in which the coupling portion 4 is to be located, small hemispherical protrusions 35 and 36 are provided at leading ends of the respective upper-side and lower-side members 32 and 33 of the terminal portion 31 of the temple. The small hemispherical protrusions 35 and 36 can be selectively fitted into the above-described two depressions 43 and 44 of the coupling portion 4.

In other words, as shown in FIG. 3, when the temple 3 is open, the small hemispherical protrusions 35 and 36 are positioned by being fitted into the second depression 44, and when the temple 3 is closed, the small hemispherical protrusions 35 and 36 are positioned by being fitted into the first depression 43. The two depressions 43 and 44 have, at respective ends thereof the raised portions 431 and 441, and thus the small hemispherical protrusions 35 and 36 are pushed against the raised portion to some extent, and then, under this force, the small hemispherical protrusions 35 and 36 are facilitated to move into the depression 43 or 44 where they are stable. At this time, a click sound is generated. The small hemispherical protrusions 35 and 36 are not stable at positions other than the two depressions, and slide freely. Accordingly, the temple 3 of the eyeglasses generates a click sound when entering an open state or a closed state, and is stable only in the open state and the closed state. In this configuration, the small hemispherical protrusions 35 and 36 of the terminal portion 31 of the temple frequently come into contact with and are pressed against the two depressions 43 and 44 of the coupling portion 4. Therefore, importance is placed on selection of types of resin as constituent materials of these constituent components, and the combination thereof. The temple 3 and the coupling portion 4 are made of resin that is viscoelastic, mechanically strong, and highly abrasion resistant, such as a urethane resin, a polyamide resin, a fluorine resin, a polyacetal resin, or a polytetrafluoroethylene (PTFE) resin. Currently, it is known that the terminal portion 31 of the temple is preferably made of a polyamide (nylon) resin, and the coupling portion 4 is preferably made of a urethane resin.

Embodiment 2

Figure 8A:
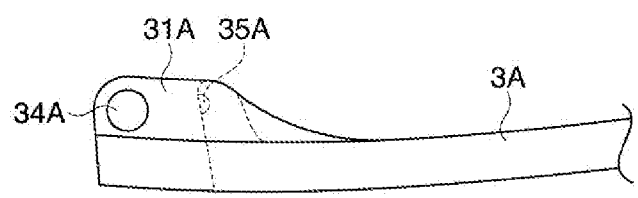
FIG. 8(a) is a plan view.
Figure 8B:
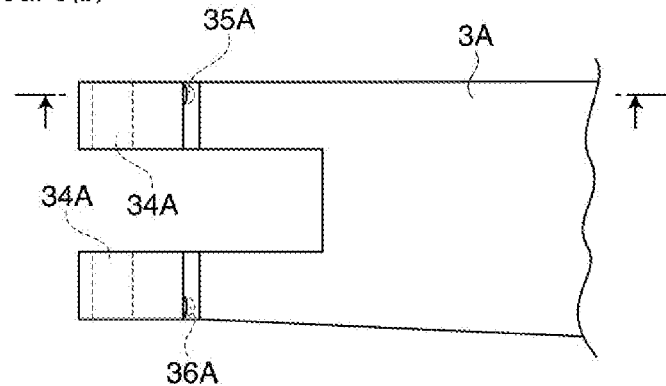
FIG. 8(b) is a side view.
Figure 8C:
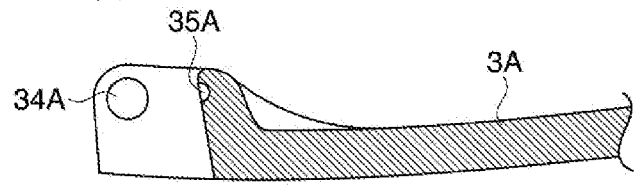
FIG. 8(c) is a cross-sectional view taken along a line indicated by arrows in FIG. 8(b).
Figure 9A:
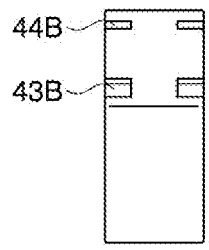
FIG. 9(a) is a left side view.
Figure 9B:
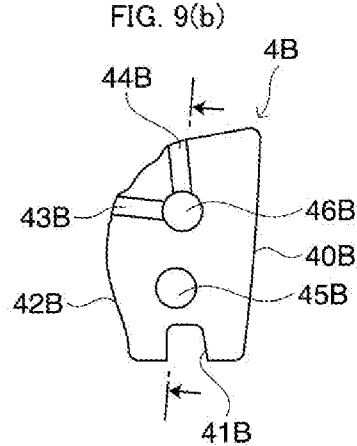
FIG. 9(b) is a front view.
Figure 9C:
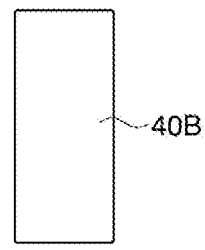
FIG. 9(c) is a right side view.
Figure 9D:
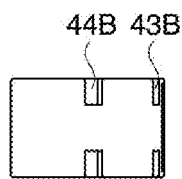
FIG. 9(d) is a plan view.
Figure 9E:
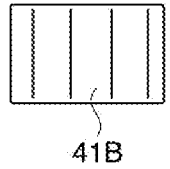
FIG. 9(e) is a bottom view.
Figure 9F:
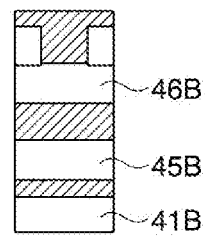
FIG. 9(f) is a cross-sectional view taken along a line indicated by arrows in FIG. 9(b).

FIGS. 7 and 8 show Embodiment 2 of the present invention. Embodiment 2 differs from Embodiment 1 in that two small hemispherical protrusions 43A and 44A are provided in place of the two depressions 43 and 44 of Embodiment 1, and depressions 35A and 36A are provided in place of the small hemispherical protrusions 35 and 36 of Embodiment 1. In other words, layout of the small hemispherical protrusions and the depressions is inverted, and it is clear that the same effects can be achieved.

Other configurations are the same as those of Embodiment 1, and thus "A" is added to the ends of the reference numerals of Embodiment 1, and detailed descriptions thereof are omitted.

Embodiment 3

Figure 10A:
FIG. 10(a) is a plan view.
Figure 10B:
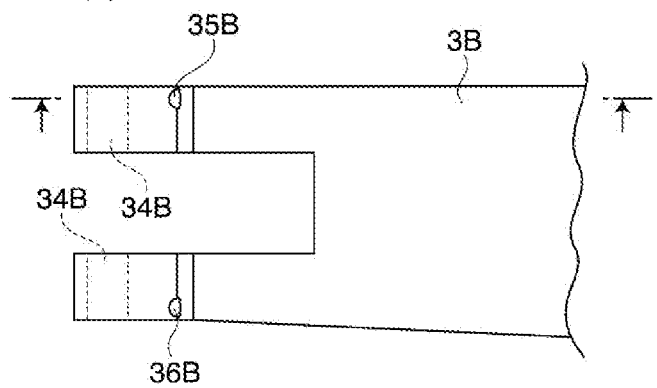
FIG. 10(b) is a side view.
Figure 10C:
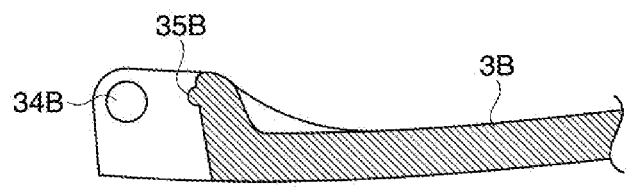
FIG. 10(c) is a cross-sectional view taken along a line indicated by arrows in FIG. 10(b).
Figure 11A:
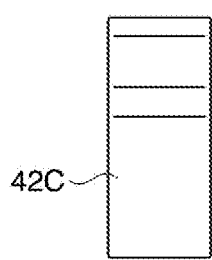
FIG. 11(a) is a left side view.
Figure 11B:
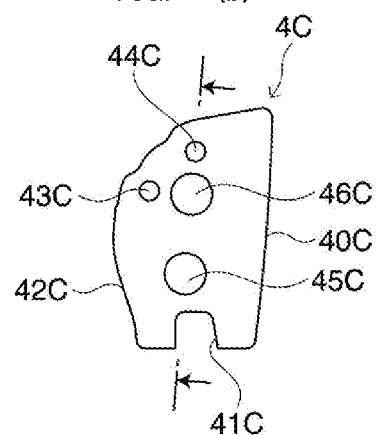
FIG. 11(b) is a front view.
Figure 11C:
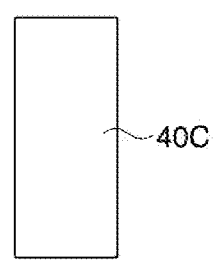
FIG. 11(c) is a right side view.
Figure 11D:
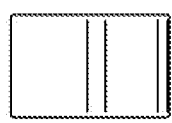
FIG. 11(d) is a plan view.
Figure 11E:
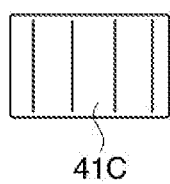
FIG. 11(e) is a bottom view.
Figure 11F:
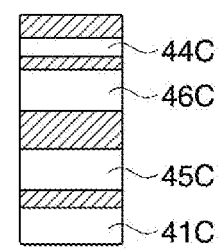
FIG. 11(f) is a cross-sectional view taken along a line indicated by arrows in FIG. 11(b).

FIGS. 9 and 10 show Embodiment 3 of the present invention. Embodiment 3 differs from Embodiment 1 in that two grooves 43B and 44B are provided in place of the two depressions 43 and 44 of Embodiment 1. As shown in FIG. 9(b), the two grooves 43B and 44B form a substantially right angle with a second screw hole 46B of a coupling portion 4B, if the second screw hole 46B is assumed to be the origin. In this configuration, the small hemispherical protrusions of the temple are selectively fitted into the two grooves 43B and 44B.

Other configurations are the same as those of Embodiment 1, and thus "B" is added to the ends of the reference numerals of Embodiment 1, and detailed descriptions thereof are omitted.

Embodiment 4

Figure 12A:
FIG. 12(a) is a plan view.
Figure 12B:
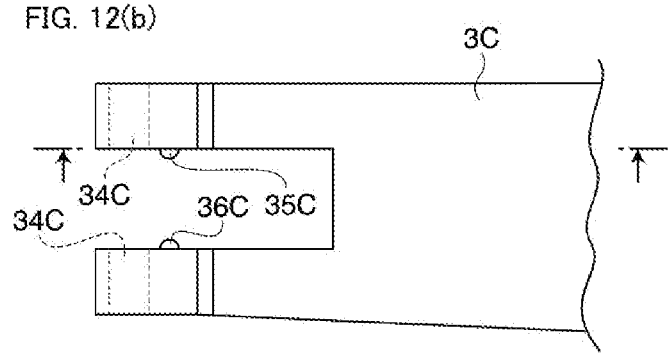
FIG. 12(b) is a side view.
Figure 12C:
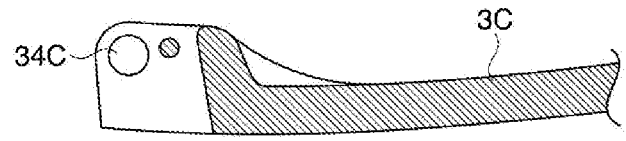
FIG. 12(c) is a cross-sectional view taken along a line indicated by arrows in FIG. 12(b).

FIGS. 11 and 12 show Embodiment 4 of the present invention. Embodiment 4 differs from Embodiment 1 in that two through holes 43C and 44C are provided in place of the two depressions 43 and 44 of Embodiment 1, and small hemispherical protrusions 35C and 36C are provided in place of the small hemispherical protrusions 35 and 36 of Embodiment 1. Note that, as shown in FIG. 11(b), the through holes 43C and 44C are formed at positions that form a substantially right angle with a second screw hole 46C of a coupling portion 4C, if the second screw hole 46C is assumed to be the origin, and as shown in FIG. 12, the small hemispherical protrusions 35C and 36C are located, while facing each other, inward of the upper-side and lower-side members 32C and 33C of the temple.

In this configuration, the small hemispherical protrusions 35C and 36C of the temple are selectively fitted into the two through holes 43C and 44C.

Other configurations are the same as those of Embodiment 1, and thus "C" is added to the ends of the reference numerals of Embodiment 1, and detailed descriptions thereof are omitted.

LIST OF REFERENCE NUMERALS

1 Eyeglass frame
2 Lens holding portion
21 Terminal portion
22 Upper-side member
23 Lower-side members
24 Third screw hole
25 Protruding portion
3 Temple
31 Terminal portion
32, 33 Upper-side and lower-side members
32C, 33C Upper-side and lower-side members
34 Fourth screw hole
35, 36 Small hemispherical protrusion
35C, 36C Small hemispherical protrusion
4 Coupling portion
40 Straight portion
41 Recessed portion
42 Curved portion
43 First depression
44 Second depression
43A, 44A Small hemispherical protrusion
43B, 44B Groove
43C, 44C Through hole
431, 441 Raised portion
45 First screw hole
46 Second screw hole
5 Hinge

What is claimed is:
1. An eyeglass frame (1) of the type having no embedded spring, comprising:
  a lens holding portion (2);
  a temple (3);
  a hinge (5) that enables pivoting of the lens holding portion (2) and the temple (3), said hinge (5) including a terminal portion (21) of the lens holding portion (2), a terminal portion (31) of the temple (3), and a coupling portion (4) that couples the terminal portion (21) of the lens holding portion (2) with the terminal portion (31) of the temple (3); and means for selectively positioning the terminal portion (31) of the temple (3) with respect to the coupling portion (4) at a position when the temple (3) is completely open and at a position when the temple (3) is folded, said means being a combination of a small hemispherical protrusion (35, 36) provided at a leading end of the terminal portion (31) of the temple, and a depression (43, 44) in the coupling portion (4), said hemispherical protrusion (35, 36) being selectively fitted into the depression (43, 44).

2. The eyeglass frame (1) according to claim 1, wherein the terminal portion (31) of the temple (3) is made of a polyamide resin, and the coupling portion (4) is made of a urethane resin.

3. An eyeglass frame (1) of the type having no embedded spring, comprising:

a lens holding portion (2);

a temple (3A);

a hinge (5) that enables pivoting of the lens holding portion (2) and the temple (3A), said hinge (5) including a terminal portion (21) of the lens holding portion (2), a terminal portion (31A) of the temple (3A), and a coupling portion (4A) that couples the terminal portion (21) of the lens holding portion (2) with the terminal portion (31A) of the temple (3A); and means for selectively positioning the terminal portion (31A) of the temple (3A) with respect to the coupling portion (4A) at a position when the temple (3A) is completely open and at a position when the temple (3A) is folded, said means being a combination of a depression (35A, 36A) provided at a leading end of the terminal portion (31A) of the temple, and a small hemispherical protrusion (43A, 44A) in the coupling portion (4A), said hemispherical protrusion (43A, 44A) being selectively fitted into the depression (35A, 36A).

4. The eyeglass frame (1) according to claim 3, wherein the terminal portion (31A) of the temple (3A) is made of a polyamide resin, and the coupling portion (4A) is made of a urethane resin.

5. An eyeglass frame (1) of the type having no embedded spring, comprising:

a lens holding portion (2);

a temple (3B);

a hinge (5) that enables pivoting of the lens holding portion (2) and the temple (3B), said hinge (5) including a terminal portion (21) of the lens holding portion (2), a terminal portion (31B) of the temple (3B), and a coupling portion (4B) that couples the terminal portion (21) of the lens holding portion (2) with the terminal portion (31B) of the temple (3B); and means for selectively positioning the terminal portion (31) of the temple (3B) with respect to the coupling portion (4B) at a position when the temple (3B) is completely open and at a position when the temple (3B) is folded, said means being a combination of a small hemispherical protrusion (35B, 36B) provided at a leading end of the terminal portion (31B) of the temple, and a groove (43B, 44B) of the coupling portion (4B), said hemispherical protrusion (35B, 36B) being selectively fitted into the groove (43B, 44B).

6. The eyeglass frame (1) according to claim 5, wherein the terminal portion (31B) of the temple (3B) is made of a polyamide resin, and the coupling portion (4B) is made of a urethane resin.

7. An eyeglass frame (1) of the type having no embedded spring, comprising:

a lens holding portion (2);

a temple (3 C);

a hinge (5) that enables pivoting of the lens holding portion (2) and the temple (3C), said hinge (5) including a terminal portion (21) of the lens holding portion (2), a terminal portion (31C) of the temple (3), and a coupling portion (4C) that couples the terminal portion (21) of the lens holding portion (2) with the terminal portion (31C) of the temple (3); and means for selectively positioning the terminal portion (31C) of the temple (3C) with respect to the coupling portion (4C) at a position when the temple (3C) is completely open and at a position when the temple (3C) is folded, said means being a combination of a small hemispherical protrusion (35C, 36C) provided in the terminal portion (31C) of the temple, and a through hole (43C, 44C) in the coupling portion (4C), said hemispherical protrusion (35C, 36C) being selectively fitted into the through hole (43C, 44C).

8. The eyeglass frame (1) according to claim 7, wherein the terminal portion (31C) of the temple (3C) is made of a polyamide resin, and the coupling portion (4C) is made of a urethane resin.

* * * * *